(12) United States Patent
Arbeiter et al.

(10) Patent No.: US 6,384,828 B1
(45) Date of Patent: May 7, 2002

(54) DIGITAL PROCESSING APPARATUS AND METHOD FOR USE IN ENLARGING THE SIZE OF AN IMAGE DISPLAYED ON A 2D FIXED-PIXEL SCREEN

(75) Inventors: James Henry Arbeiter, Hopewell; Roger Frank Bessler, Lawrenceville, both of NJ (US)

(73) Assignee: NorthShore Laboratories, Inc., Hopewell, NJ (US)

( * ) Notice: Subject to any disclaimer, the term of this patent is extended or adjusted under 35 U.S.C. 154(b) by 0 days.

(21) Appl. No.: 09/422,156

(22) Filed: Oct. 22, 1999

(51) Int. Cl.$^7$ .......................... G06T 11/00; G09G 5/26; G09G 5/00; G09G 5/02; G06K 9/32
(52) U.S. Cl. ..................... 345/472.2; 345/472; 345/648; 345/698; 382/298; 382/299; 382/300; 382/301
(58) Field of Search ............................. 345/472, 472.2, 345/648, 467, 468, 469, 470, 469.1, 698, 646–647; 382/266, 298, 299, 300, 301, 260

(56) References Cited

U.S. PATENT DOCUMENTS

| | | | | |
|---|---|---|---|---|
| 5,521,614 A | * | 5/1996 | Kotha et al. .............. | 345/472.2 |
| 5,910,805 A | * | 6/1999 | Hickey et al. ............... | 345/467 |
| 5,966,475 A | * | 10/1999 | Koon et al. .................. | 382/301 |

* cited by examiner

Primary Examiner—Jeffery Brier
Assistant Examiner—Anthony Blackman
(74) Attorney, Agent, or Firm—George J. Seligsohn

(57) ABSTRACT

Apparatus comprising a logic member and a shear member incorporating an upsampler are used to enlarge the number of pixels in at least one image dimension by a factor F=N/M, where N is a first given-valued integer, M is a second given-valued integer and 1<N/M≦2. The shear member shears the original image at certain positions of the one dimension that are determined solely by the value of factor F, thereby introducing zero-valued shear-gap pixels at each of the certain positions. The logic member, in response to solely the 6 pixel values of those pixels within a 2×3 sub-area that borders a zero-valued shear-gap pixel at each particular certain position, fills the zero-valued shear-gap at that particular certain position with an interpolated pixel value of the original image when the logic means determines that that zero-valued shear-gap occurred at a soft edge of the original image or, alternatively, with a logically-chosen non-interpolated hard-edge object pixel value or non-interpolated background pixel value when the logic means determines that that zero-valued shear-gap occurred at a hard edge of the original image. Such apparatus is effective in substantially reducing blur in the display of hard-edge objects of an enlarged-size image on a flat-panel screen composed of a predetermined fixed number of individual light-controlling elements without adversely affecting the display of soft-edge objects of the enlarged-size image on the flat-panel screen.

12 Claims, 7 Drawing Sheets

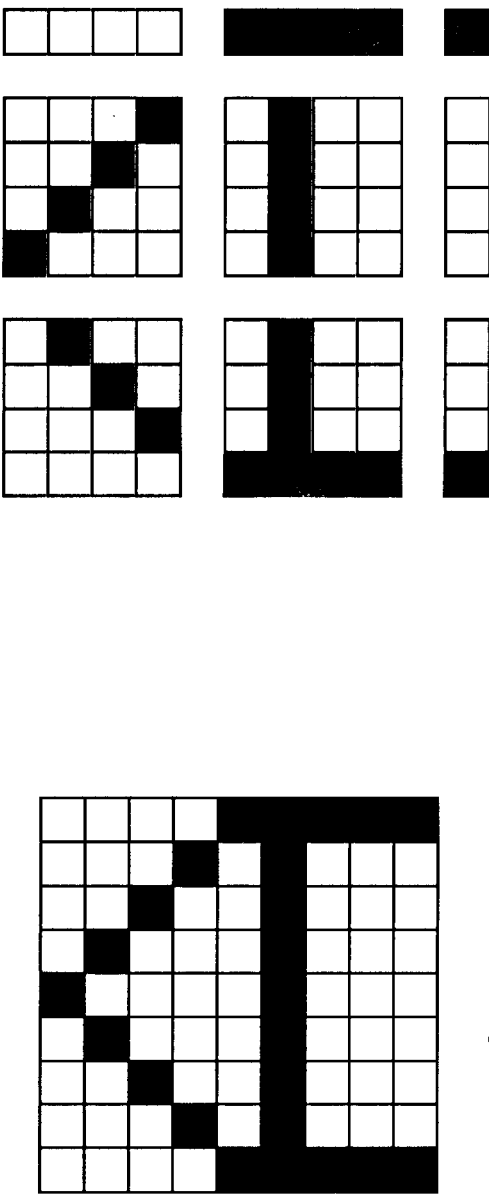
FIGURE 1a
FIGURE 1b
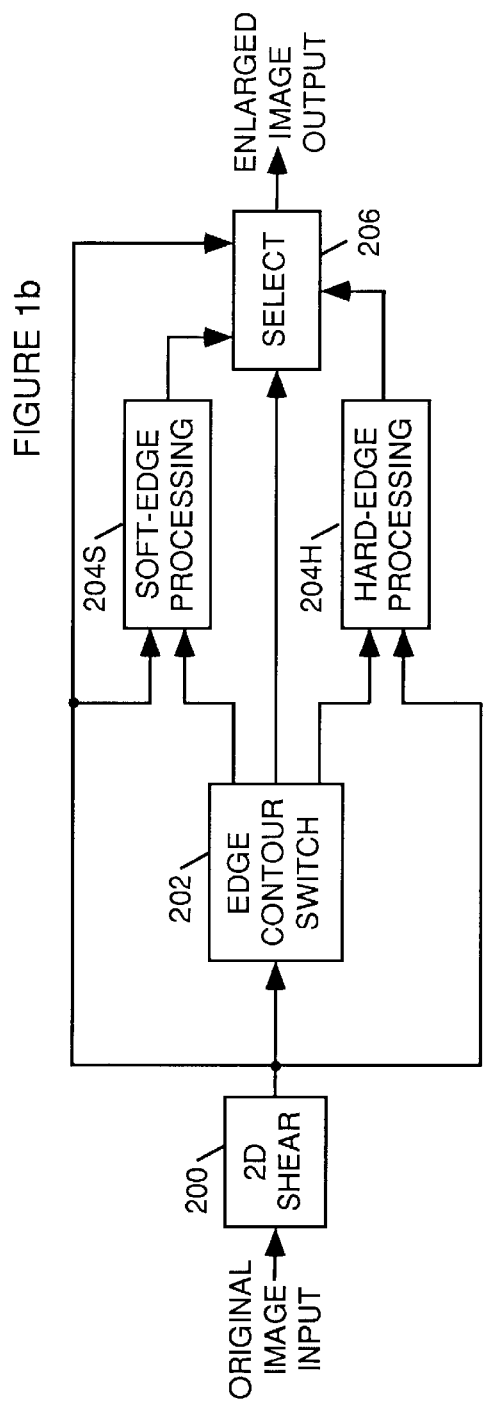
FIGURE 2

| $P_{00}$ | $P_{01}$ | $P_{02}$ | $P_{03}$ | $P_{04}$ | $P_{05}$ | $P_{06}$ | $P_{07}$ |
|---|---|---|---|---|---|---|---|
| $P_{10}$ | $P_{11}$ | $P_{12}$ | $P_{13}$ | $P_{14}$ | $P_{15}$ | $P_{16}$ | $P_{17}$ |
| $P_{20}$ | $P_{21}$ | $P_{22}$ | $P_{23}$ | $P_{24}$ | $P_{25}$ | $P_{26}$ | $P_{27}$ |

FIGURE 4a

| $P_{00}$ | $P_{01}$ | $P_{02}$ | $P_{03}$ | $0_{sh}$ | $P_{04}$ | $P_{05}$ | $P_{06}$ | $P_{07}$ |
|---|---|---|---|---|---|---|---|---|
| $P_{10}$ | $P_{11}$ | $P_{12}$ | $P_{13}$ | $0_{sh}$ | $P_{14}$ | $P_{15}$ | $P_{16}$ | $P_{17}$ |
| $P_{20}$ | $P_{21}$ | $P_{22}$ | $P_{23}$ | $0_{sh}$ | $P_{24}$ | $P_{25}$ | $P_{26}$ | $P_{27}$ |

FIGURE 4b

| $P_{03}$ | $P_{04}$ |   | DT | T |
|---|---|---|---|---|
| $P_{13}$ | $P_{14}$ | = | L | C |
| $P_{23}$ | $P_{24}$ |   | DB | B |

FIGURE 5a

| \|DT-C\| | \|T-L\| |
|---|---|
| \|L-C\| | C |
| \|DB-C\| | \|B-L\| |

DIGITAL PROCESSING APPARATUS AND METHOD FOR USE IN ENLARGING THE SIZE OF AN IMAGE DISPLAYED ON A 2D FIXED-PIXEL SCREEN

BACKGROUND

1. Field of the Invention

This invention relates to digital image-processing apparatus and, more particularly, to such apparatus for enlarging the size of a two-dimensional (2D) image that is displayed on a flat-panel screen composed of at least one 2D array of a predetermined fixed number of individual light-controlling elements.

2. Description of the Prior Art

As known, both television and computer-derived images may be displayed on the screen of either a CRT or a flat-panel display device. Since a CRT produces an image by intensity-modulating a scanning electron beam in accordance with an image-defining signal, there is no problem in displaying an enlarged image on the screen of a CRT display device. However, a flat-panel display device has a fixed pixel density for a given size screen, which fixed pixels comprise a predetermined fixed number of individual light-controlling (e.g., LCD, LED or gas-filled) elements. In a monochrome flat-panel display device, the predetermined fixed number of individual light-controlling elements are arranged in a single 2D array responsive to a single luminance (L) signal, while in a color flat-panel display device, the predetermined fixed number of individual light-controlling elements are arranged in separate, nearly-superimposed, red (R), green (G) and blue (B) 2D arrays responsive, respectively, to separate R, G and B chrominance (Ch) signals. The display of an enlarged computer-derived image, where L and Ch signals comprise discrete pixel sample values, on the screen of a flat-panel display device presents a problem when the ratio of the predetermined fixed number of individual light-controlling elements to the enlarged number of discrete pixel sample values is a fraction between 1 and 2.

When information created at one resolution, say VGA of pixel density 640×480 horizontal and vertical pixels, is to be displayed onto a SVGA display of pixel density 800×600 pixels the image does not fill out the display area; in fact, it covers only 80% of the viewable display area. When the same content is displayed on a XGA screen of 1024×768 pixels only 62.5% of the screen is covered. This problem has created a need for small incremental changes in image size to accommodate the resolution differences of VGA, SVGA, XGA, and UXGA in order to maintain full-screen display usage.

Image content resolution is set by the supplier and is not changeable by the viewer, as is witnessed by anyone who uses the internet. This mismatch between supplier and viewer necessitates an image transformation where the source material is scaled appropriately to match the screen resolution of a viewer's flat-panel display device. The transformation need only change image size by 1.25 for VGA to SVGA, 1.28 for SVGA to SXGA, 1.6 for VGA to XGA, and 2.0 for VGA to SXGA. Current practices are to adjust the size of the image by interpolating the image to stretch it to fit the desired display. Interpolation inserts new pixels at newly required positions based on an arithmetic combination of pixels closest to the new position in the original image.

Most often these interpolation processes impose limits on the fidelity of the newly stretched flat-panel displayed image. Common interpolation functions typically impose a loss of high frequency because of the low-pass nature of the interpolating function, and therefore, a loss in frequency resolution into the data particularly observed on sharp transition signals like text and graphics. This is obviously not desirable because now the displayed information appears to be blurred, which makes for a rather fatiguing viewing experience for the viewer. Image enlargement techniques include both linear and non-linear; however, the objective, which is to stretch the image data by using an interpolating function that combines neighboring pixel data, is the same. These approaches fall short of the desired result to faithfully reproduce the image information with the same frequency characteristics or edge profiles of the original data.

Conversely, prior-art approaches like pixel replication used in scaling infinite-frequency data like binary text and graphics would not work well in scaling gray-scaled images and anti-aliased text and graphics. And because information may come to a viewer with several of these data types mixed together, such as a page of internet data, an enlarging process that works well on both would provide great benefit.

In the prior art, interpolation is employed by digital image-processing apparatus for determining the proper value for each of the enlarged number of discrete pixel sample values. Fractional linear interpolation, taught in our U.S. Pat. No. 5,355,328, entitled "Resampling Apparatus Suitable for Resizing a Video Image," which issued Oct. 11, 1994, is the simplest approach. Linear interpolation, however, imposes too much higher frequency loss causing blurring of sharp edges. Greggain, in his U.S. Pat. No. 5,502,662, entitled "Method And Apparatus For Quadric Interpolation," which issued Mar. 26, 1996,", teaches an improvement on linear interpolation by fitting a second-order curve to the image data instead, thereby reducing frequency loss and maintaining sharper edges. Liu, in his U.S. Pat. No. 5,880,767, entitled "Perceptual Image Resolution Enhancement System", which issued Mar. 9, 1999, teaches sharpening across multiple frequency bands, and protects against edge overshoots to limit visual artifacts. His system again offers sharpened images, but boosting the signal in each band does not restore the lost resolution resulting from the spreading of the data.

None of these methods work well on the extremely hard (i.e., sharp) edges of binary text and graphics. Because binary data is the most common information displayed in daily uses of computer images, it becomes important to the viewer to have sharp edges. Eye strain and fatigue are the obvious consequences of poor edge fidelity.

Therefore, there is a need for an image-enlarging approach, suitable for use with a flat-panel displayed image, which results in a faithful reproduction of the original image for (1) hard (infinite-frequency) edge data, like binary text graphics, (2) soft (Nyquist-bounded) edge data, like natural-scene images (e.g., digital photographs) or adjacent horizontal or vertical pixels having substantially uniform intensity values, and (3) a mixture of both hard and soft edge data.

SUMMARY OF THE INVENTION

The present invention is directed to digital image-processing apparatus or method responsive to pixel values of pixels defining a digitized original 2D image for increasing the number of the pixels in at least one of horizontal and vertical dimensions of the original image by a factor $F=N/M$, where (1) each of the pixel values falls within a range of V pixel values which extend from a quantized pixel value of 0 to a quantized pixel value of $V-1$, (2) N is a first given-valued integer, (3) M is a second given-valued integer and (4) 1<N/M≦2.

Such apparatus comprises shear means incorporating upsampling means and logic means. The shear means is responsive to the pixels defining the original image for shearing the original image at certain positions of the one dimension that are determined solely by the value of factor F, thereby introducing zero-valued shear-gap pixels at each of the certain positions. The logic means is responsive to solely the 6 pixel values of those pixels within a 2×3 sub-area that borders a zero-valued shear-gap pixel at each particular certain position for filling the zero-valued shear-gap at that particular certain position with an interpolated pixel value of the original image in response to the logic means determining that that zero-valued shear-gap occurred at a soft edge of the original image or, alternatively, filling the zero-valued shear-gap at that particular certain position with a logically-chosen non-interpolated hard-edge object pixel value or non-interpolated background pixel value in response to the logic means determining that that zero-valued shear-gap occurred at a hard edge of the original image. This results in the use of the digital image-processing apparatus being effective in substantially reducing blur in the display of hard-edge objects of a digitized enlarged-size 2D image on a flat-panel screen composed of at least one 2D array of a predetermined fixed number of individual light-controlling elements without adversely affecting the display of soft-edge objects of the digitized enlarged-size 2D image on the flat-panel screen.

The steps of the digital image-processing method are directed to the functions performed by the shear means incorporating upsampling means and the logic means of the digital image-processing apparatus.

BRIEF DESCRIPTION OF THE DRAWING

FIGS. 1a and 1b, respectively, show, as an example of the "2D shear" principle of the present invention, the text letter "A in its original size and after having been enlarged in size by upsampling;

FIG. 2 diagrammatically shows the combination of the five functional blocks comprising the present invention;

FIG. 4a illustrates the arrangement of the first 8 pixels of each of the first 3 pixel rows displayed on a flat-panel display device prior to being horizontally sheared;

FIG. 4b illustrates the arrangement of the first 8 pixels of each of the first 3 pixel rows displayed on a flat-panel display device subsequent to being horizontally sheared;

FIG. 5a illustrates a generalization in the terminology employed to designate any 2×3 array of 6 contiguous pixel values of the original image that border a horizontal-shear gap;

FIG. 5b illustrates the generalization in the terminology employed to designate the absolute value of the difference between the 2nd row,2nd column pixel value and each of the 5 other pixel values of the 2×3 array of FIG. 5a;

FIGS. 8a–8d, for illustrative purposes, show the steps of the present invention employed in the enlargement of the horizontal size of the text letter "A".

DESCRIPTION OF THE PREFERRED EMBODIMENTS

In accordance with the principles of the present invention, the ratio of the integer number of pixels in the enlarged 2D image in each of the horizontal and vertical directions to the integer number of pixels in the original 2D image may have any value F, where 1<F≦2. However, solely for illustrative purposes in describing the invention, it is assumed that this ratio is 5/4 (i.e., the ratio of the SVGA pixel density of 800×600 to the VGA pixel density of 640×480).

FIG. 1a shows a binary-valued 9×9 pixel array defining the text letter "A" of the original image and FIG. 1b shows a binary-valued 11×11 pixel array defining this text letter "A" after it has been upsampled in each of the horizontal and vertical directions by the ratio 5:4 in accordance with the "shear" principle of the present invention. More specifically, the ratio of 5:4 is obtained by shearing the 9×9 pixel array of FIG. 1a after each group of 4 consecutive pixels in each of the horizontal and vertical directions and then inserting an extra pixel between each pair of adjacent groups, as shown in FIG. 1b. The upsampled sheared image is then digitally processed in the manner functionally shown in FIG. 2 to provide an enlarged output image which faithfully reproduces the image information with the same frequency characteristics or edge profiles of the original input image.

Referring to FIG. 2, an ongoing digitally-sampled signal stream defining the original image is applied as an input to 2D shear means 200. This results in an ongoing digitally-sampled output signal stream from 2D shear means 200 defining the upsampled sheared image, which is applied, respectively, as an input to edge contour switch 202, a first input to soft-edge processing means 204S, a first input to hard-edge processing means 204H and a first input to select means 206. Edge contour switch 202, which performs the logical function of discriminating between soft-edge and hard-edge image information applied as an input thereto, applies a control signal output therefrom as a disable/enable control second input to soft-edge processing means 204S, as an enable/disable control second input to hard-edge processing means 204H, and-as a select control second input to select means 206. When enabled, soft-edge processing means 204S applies an ongoing digitally-sampled processed output signal stream therefrom as a third input to select means 206 and, when enabled, hard-edge processing means 204S applies an ongoing digitally-sampled processed output signal stream therefrom as a fourth input to select means 206. The ongoing digitally-sampled output signal stream from select means 206 defines the enlarged image output from FIG. 2.

Figure 3A:
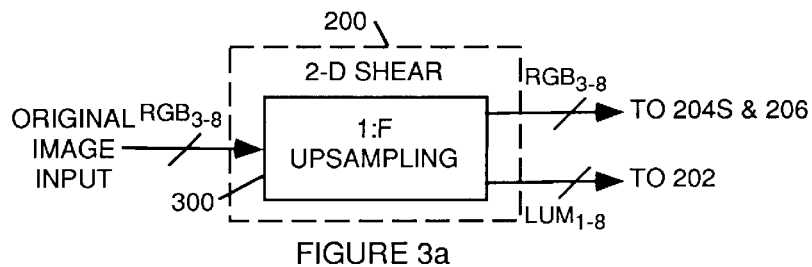
FIG. 3a is a functional block diagram of a preferred embodiment of the first of the five functional blocks of the combination shown in FIG. 2.

Referring to FIG. 3a, there is shown a preferred embodiment of 2D shear means 200, wherein (1) 2D shear means 200 comprises 1:F upsampling means 300, (2) the original image is an RGB color image in which the quantized intensity of each pixel of each of the 3 colors is digitally defined by 3 separate ongoing 8-bit (designated $RGB_{3-8}$) signal streams applied as an input to 1:F upsampling means 300, thereby deriving $RGB_{3-8}$ upsampled signal streams as a first output from upsampling means 300, and (3) upsampling means 300 includes means for combining these separate R, G and B components of the color image inputs thereto into a single luminance image that is then upsampled into a single ongoing 8-bit (designated $LUM_{1-8}$) upsampled second output signal stream from upsampling means 300. All of the pixels of the $RGB_{3-8}$ upsampled first output from upsampling means 300 are applied as a first input to select means 206, while only those pixels within a 2×3 sub-area bordering a shear gap of the $RGB_{3-8}$ upsampled first output from upsampling means 300 are applied as a first input to soft-edge processing means 204S and only those pixels within a 2×3 sub-area bordering a shear gap of the $LUM_{1-8}$ upsampled second output from upsampling means 300 are applied as a first input to hard-edge processing means 204H.

In FIG. 4a, $P_{00}$ to $P_{27}$ represent the particular intensity values of the first 8 pixels of each of the first 3 rows of the single luminance image prior to undergoing shearing and upsampling, while, in FIG. 4, $P_{00}$ to $P_{27}$ represent these same intensity values, without change, subsequent to the single luminance image undergoing shearing and upsampling. As noted in FIG. 4b, a zero-intensity value ($0_{SH}$), which is inserted, respectively, between $P_{03}$ and $P_{04}$, $P_{13}$ and $P_{14}$ and $P_{23}$ and $P_{24}$ function as place markers to define the positions of the added pixels comprising a shear pixel column. Further, each of the single upsampled luminance image and R, G and B upsampled color-component images comprises similar $0_{SH}$ intensity values to define the positions of the added pixels comprising each of the shear pixel rows and columns thereof.

Figure 3B:
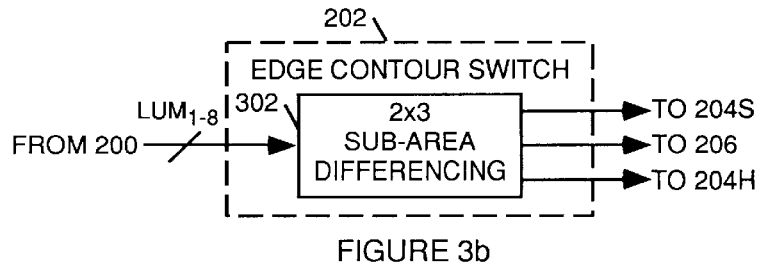
FIG. 3b is a functional block diagram of a preferred embodiment of the second of the five functional blocks of the combination shown in FIG. 2.

Referring to FIG. 3b, there is shown a preferred embodiment of edge contour switch 202, wherein edge contour switch 202 comprises 2×3 sub-area differencing means 302. Horizontal and vertical image processing of the 2D input image data to 2×3 sub-area differencing means 302 may be done separately. Omitting all rows and columns of $0_{SH}$ pixel intensity values, the 2×3 sub-area comprises the 6 pixel intensity values of each remaining 2 column×3 row sub-area of an upsampled image being horizontally processed or, alternatively, the 6 pixel intensity values of each remaining 2 row×3 column sub-area of an upsampled image being vertically processed.

In order to facilitate understanding, a one-dimensional horizontal-orientation employing a 2 column×3 row sub-area is assumed in the following description of the invention. However, it should be understood that the principles of the present invention applies equally to the case of a one-dimensional vertical-orientation employing a 2 row×3 column sub-area In the assumed case, the 2 column×3 row sub-area 500 of FIG. 5a comprises the 3 pixel intensity values of the column of FIG. 4b immediately to the left of the column of $0_{SH}$ pixel intensity values and the 3 pixel intensity values of the column of FIG. 4b immediately to the right of the column of $0_{SH}$ pixel intensity values.

The terminology used to designate the relative position of each of the 6 pixel intensity values in a 2×3 sub-area is generalized, for the case of horizontal processing of the image data in the 2 column×3 row sub-area 502 of FIG. 5a. Specifically, the upper-left pixel is designated DT (diagonal top), the upper-right pixel is designated T (top), the middle-left pixel is designated L (left), the middle-right pixel is designated C (center), the lower-left pixel is designated DB (diagonal bottom) and the lower-right pixel is designated B (bottom).

The image data in the 2 column×3 row sub-area 504 of FIG. 5b indicates the computations to be performed in a certain order by 2×3 sub-area differencing means 302 on each successive pair of pixels for the case of horizontal processing of the image data. First, no computation takes place for pixel C. Second, the computed absolute value $|L-C|$ of the difference between the intensities of the L and C pixels is substituted for pixel L. Third, the absolute value $|L-C|$ is compared to a relatively high first threshold value T1 (e.g., 150 with respect to a range of values extending from 0 to 255). The first threshold value T1 is actually a value indicative of the contrast range allowed for the hard edges and the soft edges. Binary data has a large contrast value and so the corresponding $|L-C|$ value will be driven to a greater value than softer-edge data. If this absolute value is below this first threshold value T1, a soft edge is indicated that results in an enabling control signal to be applied to soft-edge processing means 204S and a disabling control signal to be applied to hard-edge processing means 204H from 2×3 sub-area differencing means 302, and no further computation takes place. However, if this absolute value is equal to or above this first threshold value T1, a hard edge is indicated that results in a disabling control signal to be applied to soft-edge processing means 204S and an enabling control signal to be applied to hard-edge processing means 204H from 2×3 sub-area differencing means 302, and further the remaining computation shown in FIG. 5b takes place. Specifically, the computed absolute value $|DT-C|$ of the difference between the intensities of the DT and C pixels is substituted for pixel DT, the computed absolute value $|T-L|$ of the difference between the intensities of the T and L pixels is substituted for pixel T, the computed absolute value $|DB-C|$ of the difference between the intensities of the DB and C pixels is substituted for pixel DB, and the computed absolute value $|B-L|$ of the difference between the intensities of the B and L pixels is substituted for pixel B. The 4 diagonal-indicative computed values $|DT-C|$, $|DB-C|$, $|T-L|$ and $|B-L|$ shown in FIG. 5b, along with the aforesaid enabling signal are forwarded to hard-edge processing means 204-H from 2×3 sub-area differencing means 302.

Figure 6A:
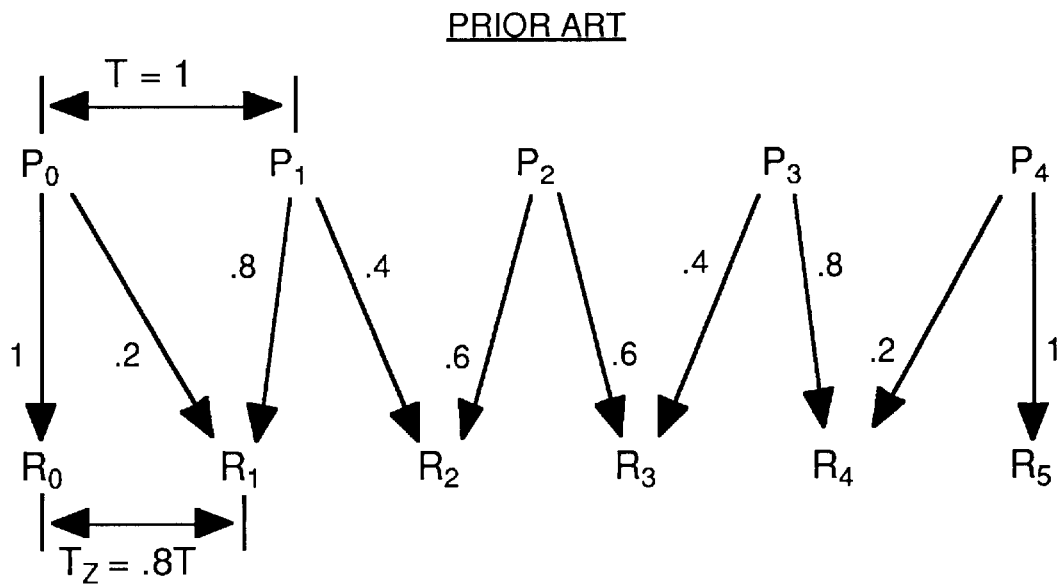
FIG. 6a illustrates the conventional prior-art linear interpolation process.

Referring now to FIG. 6a, there is indicated the conventional prior-art linear interpolation process for the assumed case in which the ratio of the integer number of pixels in the enlarged 2D image in each of the horizontal and vertical directions to the integer number of pixels in the original 2D image is 5/4. In this case, if the normalized clock period T employed by the original 2D image is equal to 1, the enlarged 2D image needs to employ a higher frequency clock period exhibiting a normalized clock period $T_Z$ of only 0.8T. In accordance with this conventional prior-art linear interpolation process, each successive group of 5 successive pixel values $P_0$ to $P_4$ of the original 2D image is mapped to a group of 6 successive pixel values of $R_0$ to $R_5$ of the enlarged 2D image. As indicated, the pixel values $R_0$ and $R_5$ do not require interpolation, so that the pixel value $R_0$ equals pixel value $P_0$ and the pixel value $R_5$ equals pixel value $P_4$. However, the relationship between the interpolated pixel value of each of $R_1$, $R_2$, $R_3$ and $R_4$ and the pixel values $P_0$ to $P_4$ is $R_1=0.2\,P_0+0.8\,P_1$; $R_2=0.4\,P_1+0.6\,P_2$; $R_3=0.6\,P2+0.4\,P_3$, and $R_4=0.8\,P_3+0.2\,P_4$.

Figure 3C:
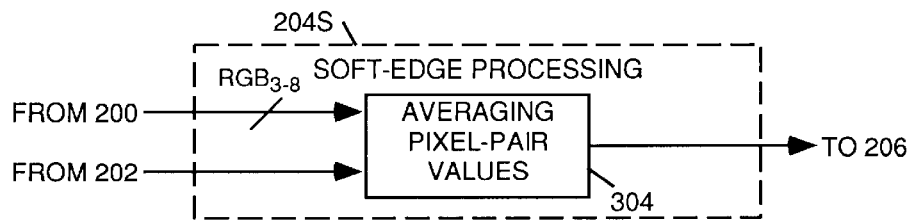
FIG. 3c is a functional block diagram of a preferred embodiment of the third of the five functional blocks of the combination shown in FIG. 2.
Figure 6B:
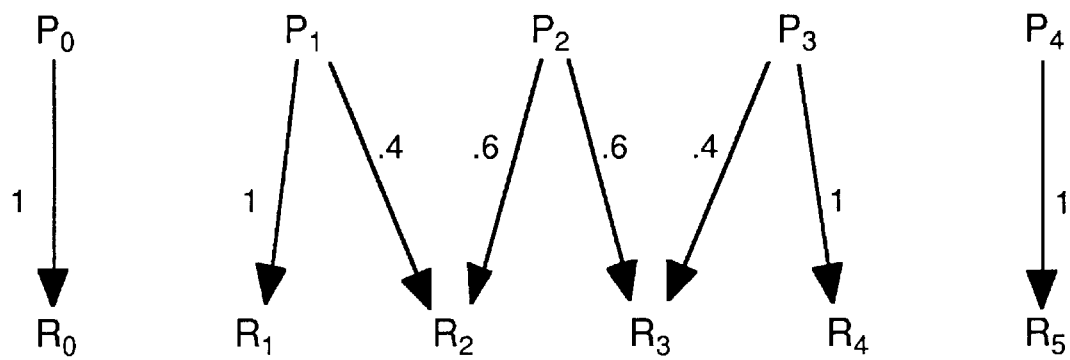
FIG. 6b illustrates a modification of the conventional prior-art linear interpolation process in accordance with a principle of the present invention.
Figure 6C:
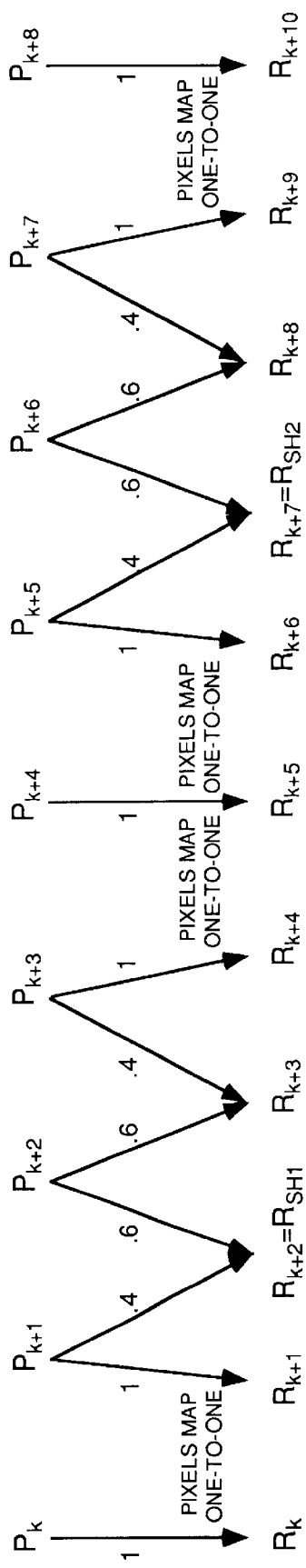
FIG. 6c illustrates the modification shown in FIG. 6b applied to soft-edge processing of horizontally-sheared data.
Figure 7A:
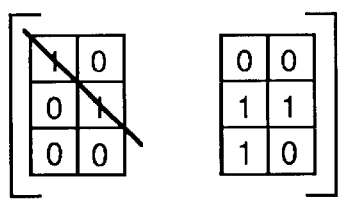
FIGS. 7a–7h illustrate the specific application of FIGS. 5a and 5b to each of 8 different arrangement of the 6 contiguous pixel values in the 2×3 array in performing the diagonal connectivity measurements of hard-edge processing shown in FIG. 3d.
Figure 7E:
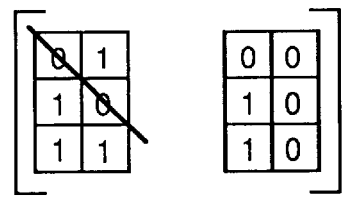
Figure 7B:
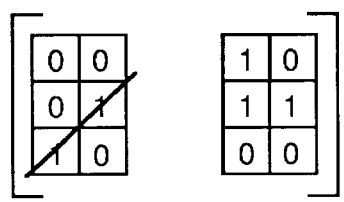
Figure 7F:
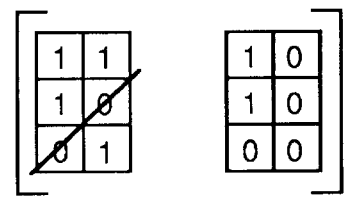
Figure 7C:
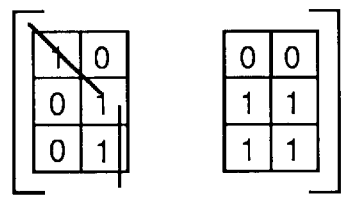
Figure 7G:
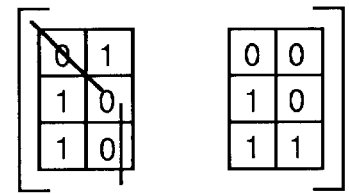
Figure 7D:
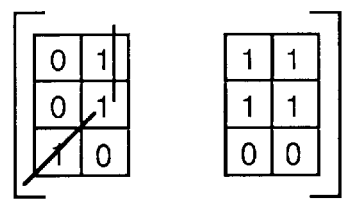
Figure 7H:
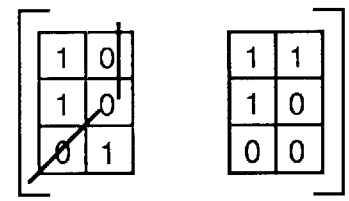

As can be seen in FIG. 6a, every output pixel value $R_0$ to $R_5$ is a linear combination of one or two input pixel values $P_0$ to $P_4$, which produces a lowpass filter effect, i.e. a noticeable blur of the displayed enlarged data. This is not desirable for either soft-edged natural images or hard-edged binary images. FIG. 6b indicates a modified interpolation approach employed by the present invention for the display of enlarged soft-edged natural image data which minimizes this undesirable blur. In accordance with this approach, normalized interpolation pixel values that are small (i.e. $P_i \leq 0.2$) are forced to a pixel value of 0 and, normalized interpolation pixel values that are high (i.e. $P_i \geq 0.8$) are forced to a pixel value of 1. Thus, in FIG. 6b, The mapped pixel values $R_0$, $R_1$, $R_4$ and $R_5$ exactly correspond, respectively, one-to-one to the pixel values $P_0$, $P_1$, $P_3$ and $P_4$, so that the use of interpolated pixel values is limited to only $R_2$ and $R_3$. FIG. 6c indicates this FIG. 6b mapping applied to soft-edge processing of horizontally-sheared data, wherein averaging pixel-pair values 304 of soft-edge processing means 204S shown in FIG. 3c inserts in its output an interpolated value of $0.4P_{k+1}+0.6P_{k+2}=R_{k+2}$ that corresponds to the new pixel value to be placed into the first shear gap of $R_{SH1}$ and the interpolated value of pixel of $0.4P_{k+5}+0.6P_{k+6}=R_{k+2}$ corresponds to the new pixel value to be placed into the second shear gap of $RSH_2$. Generalizing, as one moves across the image, every group of 4 successive input pixel values requires a shear pixel value $R_{SH(1\pm x)}=0.4P_{(k\pm 1\pm 4x)}+0.6P_{(k+2\pm 4x)}$ (where $x=0, 1, 2, 3$ etc.) to be introduced into the data. Similarly, averaging pixel-pair values 304 of soft-edge processing means 204S inserts an interpolated value of $0.6P_{(k+2\pm 4x)}+0.4P_{(k+3\pm 4x)}=(R_{SH(1\pm x)}+1)$ for the pixel immediately to the right of an introduced shear pixel value. All the pixel-value outputs $R_{SH(1\pm x)}$ and $(R_{SH(1\pm x)}+1)$ from soft-edge processing means 204S are applied as inputs to select means 206. Since all other pixel values are to be mapped one-to-one, they do not need to be processed by averaging pixel-pair values 304 of soft-edge processing means 204S because they will be properly mapped into the sheared image by below-described map into sheared image means 314 of select means 206, shown in FIG. 3e.

Figure 3D:
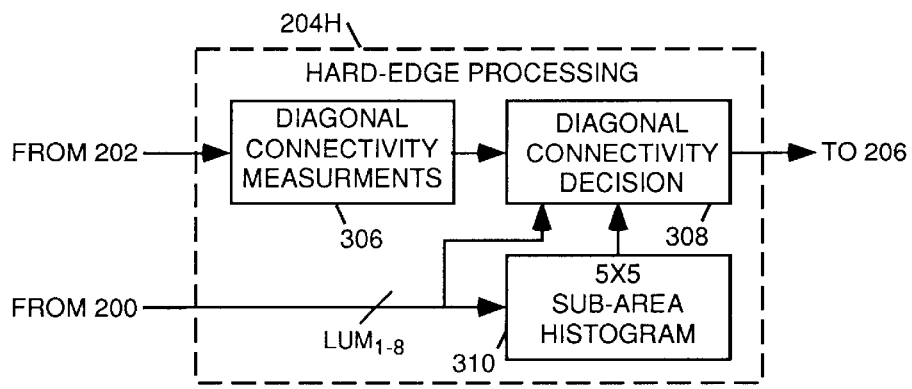
FIG. 3d is a functional block diagram of a preferred embodiment of the fourth of the five functional blocks of the combination shown in FIG. 2.

Referring now to FIG. 3d, there is shown diagonal connectivity measurements means 306, diagonal connectivity decision means 308 and 5×5 sub-area histogram means 310 of hard-edge processing means 204-H. In the case of text, single-line graphics, and other hard-edged contours the processing data path as described above is similar to that described above for soft-edged contours except that at the shear junction no filtering, interpolation, or data mixing is ever done because this would be catastrophic to any hard-edged object as it would introduce smear and result in visually fatiguing viewing of text and graphics. Instead, as discussed above in connection with FIG. 5b, if a computed first threshold value T1 (equal to the absolute value of the difference between the amplitude intensities of the L and C pixels) is a relatively high value (e.g., 150 with respect to a range of values extending from 0 to 255), an enabling signal together with all 4 of the diagonal-indicative computed values |DT−C|, |DB−C|, |T−L| and |B−L| shown in FIG. 5b are forwarded from 2×3 sub-area differencing means 302 to diagonal connectivity measurements means 306.

What is important at the shear gap where a new pixel is to be inserted is the connectivity horizontally and diagonally of pixels within the 2 column 3 row sub-area about the shear before shearing. Above-described FIGS. 4a and 4a show, respectively, a subarray of pixels from an original image and a horizontally sheared original. When a shear gap is introduced into the data, the data is torn away from its connecting neighbors. In FIGS. 4a and 4b, for example, the relationships between $P_{03}$ and $P_{04}$, $P_{13}$ and $P_{14}$, and $P_{23}$ and $P_{24}$ are disturbed.

Diagonal connectivity measurements means 306 is a logic means that only operates on each 2×3 sub-area of original-image pixel values which border each shear gap $R_{SH(1\pm x)}$, so that none of the pixel values of such a 2×3 sub-area map one-to one with the enlarged image. Employing the 4 diagonal-indicative computed values |DT−C|, |DB−C|, |T−L| and |B−L| shown in FIG. 5b, diagonal connectivity measurements means 306 determines whether or not there exists any connectivity relationships among neighboring pixels in the original image at each shear gap $R_{SH(1\pm x)}$. In this regard, each of FIGS. 7a to 7h shows a different one of a group of 8 diagonal connectivity relationships between pixel values each 2×3 sub-area about the shear gap $R_{SH(1\pm x)}$ before shearing with respect to a corresponding diagonal-indicative computed value. Specifically, the diagonal connectivity relationship shown in sub-areas $700_a$, $700_b$, $700_c$, $700_d$, $700_e$, $700_f$, $700_g$ and $700_h$ correspond, respectively, to the diagonal-indicative computed value shown in sub-areas $702_a$, $702_b$, $702_c$, $702_d$, $702_e$, $702_f$, $702_g$ and $702_h$. The patterns shown in sub-areas $700_a$, $700_b$, $700_c$, $700_d$, $700_e$, $700_f$, $700_g$ and $700_h$ are sensitive to both bright feature foregrounds (denoted by "1" pixel values) on darker backgrounds (denoted by "0" pixel values) and darker feature foregrounds (denoted by "0" pixel values) on bright backgrounds (denoted by "1" pixel values). The line segment(s) through such a pattern indicates the feature of interest in that pattern.

Specifically, diagonal connectivity measurements means 306 determines that diagonal connectivity exists for an explored pixel value C by deriving a logic "1" as an output therefrom only if at least one of the 4 diagonal-indicative computed values |DT−C|, |DB−C|, |T−L| and |B−L| is smaller than a second relatively low second threshold value T2 (e.g., 30 with respect to a range of values extending from 0 to 255). Otherwise, diagonal connectivity measurements means 306 derives a logic "0" output therefrom for such an explored pixel C. It has been determined experimentally that visually pleasing results are obtained when only the group of 8 diagonal connectivity relationships shown in FIGS. 7a to 7h are explored, so that it is not necessary diagonal connectivity measurements means 306 to explore all 64 ($2^6$) pixel-value combinations of a 2 column 3 row sub-area. The output from diagonal connectivity measurements means 306 is applied as a first input to diagonal connectivity decision means 308.

Further, the patterns shown in FIGS. 7a to 7h are sensitive to both bright feature foregrounds on darker backgrounds and darker feature foregrounds on bright backgrounds. Therefore, there is a question of how to distinguish between feature foreground and background. This question is answered by 5×5 sub-area histogram means 310, which computes a histogram of the frequency distribution of pixel amplitudes of the original image within a 5×5 window centered about the shear gap of evaluation. A window size of 5×5 pixels works well. The most common occurring pixel amplitude is then considered to be the background pixel value. While determination of background pixel values using a histogram or other counting method is subject to error if the subarea selected does not truly present a greater number of background to feature foreground pixels, it has been shown to be quite robust in many text and simple graphic tests. The output of 5×5 sub-area histogram means 310, which is the evaluated background pixel amplitude value, is applied as a second input to diagonal connectivity decision means 308. Further, the amplitude value of the pixel C (shown in sub-area 502 of FIG. 5a) of the $LUM_{1-8}$ input to hard-edge processing means 204H is applied as a third input to diagonal connectivity decision means 308.

Diagonal connectivity decision means 308 is a logic means which forwards the amplitude value of the pixel C as the output therefrom to fill a shear gap $R_{SH(1\pm x)}$ in response to the first input thereto being a logic "1" or, alternatively, forwards the evaluated background pixel amplitude value as the output therefrom to fill a shear gap $R_{SH(1\pm x)}$ in response to the first input thereto being a logic "0". Further, a pixel ($R_{SH(1\pm x)}$+1), positioned immediately to the right of a shear gap $R_{SH(1\pm x)}$, always has a pixel value C. Therefore, in all cases, diagonal connectivity decision means 308 forwards pixel value C as the output therefrom for every pixel ($R_{SH(1\pm x)}$+1). All the pixel-value outputs $R_{SH(1\pm x)}$ and ($R_{SH(1\pm x)}$+1) from hard-edge processing means 204H are applied as inputs to select means 206. Since all other pixel values are to be mapped one-to-one, they do not need to be processed by hard-edge processing means 204H because they will be properly mapped into the sheared image by below-described map into sheared image means 314 of select means 206, shown in FIG. 3e.

Figure 3E:
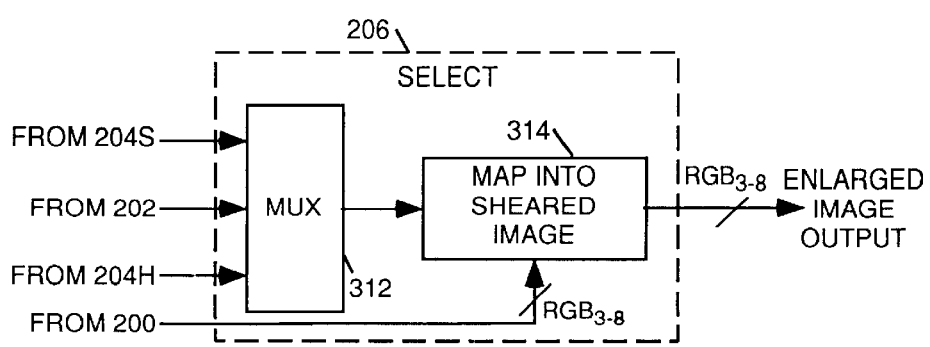
FIG. 3e is a functional block diagram of a preferred embodiment of the fifth of the five functional blocks of the combination shown in FIG. 2.

Referring now to FIG. 3e, select means 206 comprises multiplexer (MUX) 312 and map into sheared image means 314. MUX 312 receives a control input from edge contour switch 202 that selectively operates MUX 312 so that either the pixel-value outputs $R_{SH(1\pm x)}$ and ($R_{SH(1\pm x)}$+1) from soft-edge processing means 204S or, alternatively, from hard-edge processing means 204H are forwarded as the first input to map into sheared image means 314 in accordance with whether the value of |L–C| computed by 2×3 sub-area differencing means 302 of edge contour switch 202 is or is not smaller than the first threshold value T1. The $RGB_{3-8}$ pixel output stream from 2-D shear means 200 (wherein each shear pixel has a zero intensity value) is applied as a second input to map into sheared image means 314. Map into sheared image means 314, which is effective in substituting the pixel-value $R_{SH(1\pm x)}$ for the zero intensity value of each shear pixel and substituting the pixel value ($R_{SH(1\pm x)}$+1) for the value of each pixel occurring immediately after a shear pixel in the $RGB_{3-8}$ pixel-stream second input to map into sheared image means 314, derives the desired $RGB_{3-8}$ enlarged image output stream from map into sheared image means 314 of select means 206.

Figures 8A, 8B, 8C, 8D:
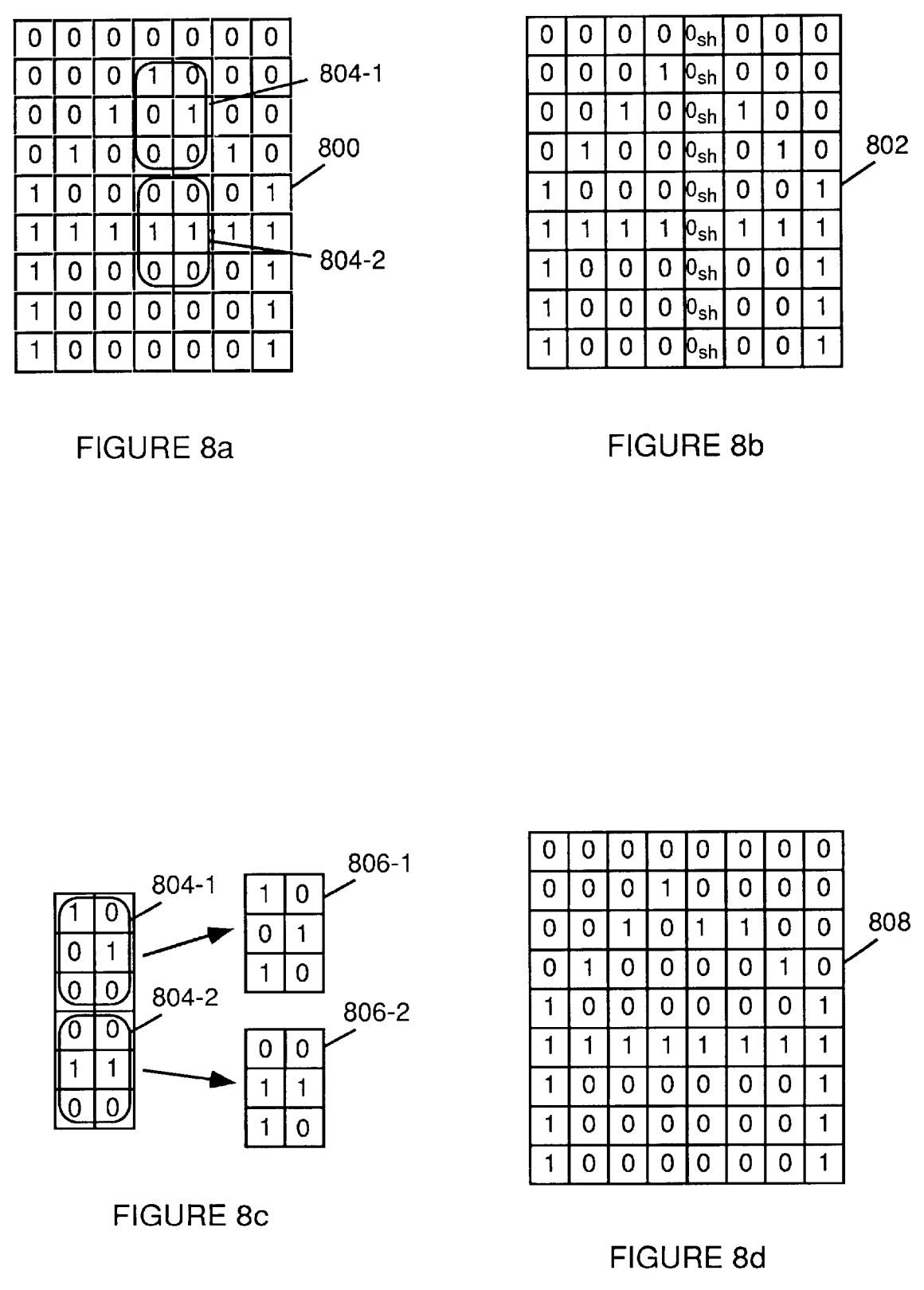

Referring now to FIGS. 8a–8d, there is shown, for illustrative purposes, the steps of the present invention employed in the enlargement of the horizontal size of the text letter "A". FIG. 8a shows a pixel area 800 of 9 rows and 7 columns of an original image wherein all the pixels defining the text letter "A" have a substantially uniform value "1" and all the pixels defining the background have a substantially uniform value "0". FIG. 8b shows a pixel area 802 of 9 rows and 8 columns of the corresponding upsampled image in which the fifth column thereof constitutes a shear gap comprising zero-valued shear pixels $0_{SH}$. FIG. 8a further shows a first 2×3 sub-area 804-1 of those pixel values that border the shear pixels $0_{SH}$ of rows 2, 3 and 4 of FIG. 8b and a second 2×3 sub-area 804-2 of those pixel values that border the shear pixels $0_{SH}$ of rows 5, 6 and 7 of FIG. 8b. FIG. 8c shows the relationship between first 2×3 sub-area 804-1 of pixel values (i.e., the pixel values shown in sub-area 502 of FIG. 5a) and its corresponding first 2×3 differencing subarea 806-1 of computed values (i.e., the computed values shown in FIG. 5b) and between second 2×3 sub-area 804-2 of pixel values and its corresponding second 2×3 differencing sub-area 806-2 of computed values. FIG. 8d shows a pixel area 808 of 9 rows and 8 columns of the corresponding upsampled image in which the zero-value of shear pixels $0_{SH}$ of FIG. 8b are replaced in the following manner by shear pixels having values determined in accordance with the principles of the present invention:

In first 2×3 sub-area 804-1, pixel value C=1 and pixel value L=0. Therefore, in first 2×3 differencing sub-area 806-1, the computed value |L–C|≦T1 indicates a hard edge, so that hard-edge processing means 204H is enabled. Further, In first 2×3 sub-area 804-1, pixel value DT=1. Therefore, in first 2×3 differencing sub-area 806-1, the computed value |DT–C|<T2, so that the diagonal connectivity constraint is met. This results in the pixel value C=1 being assigned to both the shear pixel of row 3 of FIG. 8d and the pixel immediately to the right of this shear pixel, as shown in FIG. 8d.

In second 2×3 sub-area 804-2, pixel value C=1 and pixel value L=1. Therefore, in second 2×3 differencing sub-area 806-2, the computed value |L–C|<T1 indicates a soft edge, so that soft-edge processing means 204S is enabled. However, since all the pixel values in row 6 of pixel area 800 of FIG. 8a are equal to 1, the averaging of pixel pair values to obtain the pixel value for the shear pixel of row 6 of FIG. 8d and for the pixel immediately to the right of this shear pixel results in a computed pixel value of 1 for each of these pixels, as shown in FIG. 8d. A 2×3 sub-area centered on row 2, rather than row 3, would be similar to first 2×3 sub-area 804-in indicating a hard edge, but would result in the pixel value C=0 being assigned to both the shear pixel of row 3 of FIG. 8d and the pixel immediately to the right of this shear pixel, as shown in FIG. 8d.

A 2×3 sub-area centered on row 1, 4, 5, 7, 8 or 9, rather than row 6, would be similar to second 2×3 sub-area 804-in indicating a soft edge, but the averaging of pixel pair values to obtain the pixel value for the shear pixel of row 1, 4, 5, 7, 8 or 9 of FIG. 8d and for the pixel immediately to the right of this shear pixel would result in a computed pixel value of 0 for each of these pixels, as shown in FIG. 8d.

Although, for illustrative purposes, the steps of the present invention employed in the enlargement of the text letter "A" have been limited in FIGS. 8a to 8d to the letter's horizontal size, it should be understood that by employing 2×3 sub-areas comprising 2 rows and 3 columns (rather than 2 columns and 3 rows), a similar enlargement of the vertical size of the text letter "A" can be realized.

More specifically, the horizontal and vertical processes either can be done separably with two consecutive stages of processing or can be done in two dimensions simultaneously. In implementing the nonseparable case, each of the horizontal and vertical dimensions could share the same two line memories to hold the 2×3 sub-area data, and two multipliers to compute the weighting in the soft edge cases. In implementing the separable case, because a diagonal measure must be made in both the horizontal and vertical processes, a duplicate number of line memories would be needed, thereby doubling the memory storage requirements. General, the multiplier coefficients employed by averaging pixel-pair values 304 depend upon the resize factor F. In the simplest mode when linear interpolation is used for F=5/4= 1.25, the values of the multiplier coefficients are 0.4 and 0.6, as shown in FIGS. 6b and 6c. However, if desired, better filters or higher orders of interpolation may be used instead.

While, for illustrative purposes, a resize factor F=5/4= 1.25 has been assumed in the above description of the present invention, other resize factors of interest include 1.28, 1.6, and 2 among others. The present invention extends to any resize factor F=N/M, where the ratio N/M is an improper fraction of a first integer larger in value than a second integer M and 1<N/M≦2. What changes for different values of the resize factor F=N/M are the positions of shear gaps and the coefficients of the multipliers employed for computing the interpolated values of each shear-gap pixel and a pixel bordering on a shear-gap pixel in the case of soft-edge processing. The changing positions of the shear gaps are obvious, as different resize factors F=N/M will cause shear gaps to open across the image in relation to the resize interval. For example, in the case where the ratio N/M=11/9, each successive group of 9 consecutive pixels of the original image would be divided into a first sub-group of 5 consecutive pixels followed by a second sub-group of 4 consecutive pixels, and then a first shear gap would be introduced at the end of each first sub-group and a second shear gap would be introduced at the end of each second sub-group. The choice of multiplier coefficients in the case of soft-edge processing will depend on the resize factor F=N/M as well, but in general will be close to those used in the F=5/4=1.25 illustrative example employed in the above-described teaching of the present invention. Regardless, of the value of the resize factor F, one-to-one exists between corresponding pixel values of all pixels of the enlarged image and all pixels of the original image except for the above-discussed interpolated values of each shear-gap pixel and a pixel bordering on a shear-gap pixel in the case of soft-edge processing. If the resize factor F=2 exactly, the connectivity and background information is unnecessary for the hard edge case, so that pixel replication is the correct operation that is should be done for all of the pixel values comprising the entire image. However, for the soft edge case, the value of the multiplier coefficients employed by averaging pixel-pair values 304 will be 0.5.

In the prior art, processing of color signals often RGB components are similarly processed in separate channels. This is sometimes necessary particularly in 2D filtering situations where each component is modified using different pixels respective of their color components. However, in the present invention, it is not necessary that all analysis done on the signal, (i.e., classification into soft/hard edge information, background estimation, and subsequent connectivity measures) be done on each color component. Instead, great hardware savings are afforded by operating on the luminance signal alone obtained by appropriate color space addition, as described above. Then only one channel of analysis is required, and since the analysis portion contains two line memories plus the present line to determine diagonally connectivity, much of the hardware considerations are reduced. Only needed in each color channel signal path is the local 1D processing to repeat a pixel or linearly combine two pixels together. Thus, only two multipliers per channel are required for color processing in addition to the luminance channel analysis processing.

What is claimed is:

1. In digital image-processing apparatus responsive to pixel values of pixels defining a digitized original two-dimensional (2D) image for increasing the number of said pixels in at least one of horizontal and vertical dimensions of said original image by a factor F=N/M, where (1) each of said pixel values falls within a range of V pixel values which extend from a quantized pixel value of 0 to a quantized pixel value of V−1, (2) N is a first given-valued integer, (3) M is a second given-valued integer and (4) 1<N/M≦2; said apparatus comprising:

shear means incorporating upsampling means responsive to said pixels defining said original image for shearing said original image at certain positions of said one dimension that are determined solely by the value of factor F, thereby introducing zero-valued shear-gap pixels at each of said certain positions; and logic means responsive to solely the 6 pixel values of those pixels within a 2×3 sub-area that borders a zero-valued shear-gap pixel at each particular certain position for filling the zero-valued shear-gap at that particular certain position with an interpolated pixel value of said original image in response to said logic means determining that that zero-valued shear-gap occurred at a soft edge of said original image or, alternatively, filling the zero-valued shear-gap at that particular certain position with a logically-chosen non-interpolated hard-edge object pixel value or non-interpolated background pixel value in response to said logic means determining that that zero-valued shear-gap occurred at a hard edge of said original image;

whereby the use of said digital image-processing apparatus is effective in substantially reducing blur in the display of hard-edge objects of a digitized enlarged-size 2D image on a flat-panel screen composed of at least one 2D array of a predetermined fixed number of individual light-controlling elements without adversely affecting the display of soft-edge objects of said digitized enlarged-size 2D image on said flat-panel screen.

2. The digital image-processing apparatus defined in claim 1, wherein said logic means comprises:

soft-edge processing means effective when enabled for filling said zero-valued shear-gap pixel with said interpolated pixel value;

hard-edge processing means effective when enabled for filling said zero-valued shear-gap pixel with said logically-chosen non-interpolated hard-edge object pixel value or non-interpolated background pixel value; and edge contour switch means for applying an enabling signal to said soft-edge processing means only if the absolute value $|L-C|<T1$ and applying an enabling signal to said hard-edge processing means only if the absolute value $|L-C|\geq T1$, where L is the pixel value of that second ordinal one of the 3 pixels of said 2×3 sub-area which borders one side of said zero-valued shear-gap pixel, C is the pixel value of that that second ordinal one of the 3 pixels of said 2×3 sub-area which borders the other side of said zero-valued shear-gap pixel, and T1 is a relatively high threshold having a given value such that V>T1>V/2.

3. The digital image-processing apparatus defined in claim 2, wherein:

V equals 256; and

T1 equals 150.

4. The digital image-processing apparatus defined in claim 2, wherein said hard-edge processing means comprises:

diagonally connectivity measurement means for determining whether or not the absolute value $|DT-C|<T2$, $|DB-C|<T2$, $|T-L|<T2$ or $|B-L|<T2$, where DT is the pixel value of that first ordinal one of the 3 pixels of said 2×3 sub-area which occurs on said one side of said zero-valued shear-gap pixel, DB is the pixel value of that third ordinal one of the 3 pixels of said 2×3 sub-area which occurs on said one side of said zero-valued shear-gap pixel, T is the pixel value of that first ordinal one of the 3 pixels of said 2×3 sub-area which occurs on the other side of said zero-valued shear-gap pixel, and B is the pixel value of that third ordinal one of the 3 pixels of said 2×3 sub-area which occurs on the other side of said zero-valued shear-gap pixel, and T2 is a relatively low threshold having a given value such that V/2>T2>0;

means responsive to the distribution of pixel values within an X×Y sub-area of pixel values of said original image bordering said shear-gap pixel, where X>3 and Y>3, for assigning that pixel value which occurs most often in said distribution as said background pixel value; and diagonally connectivity decision means for filling said zero-valued shear-gap pixel with a predetermined one of said L and C pixel values only in response to at least one of said diagonally-connectivity measured absolute values |DT−C|, |DB−C|, |T−L| and |DT−C| being less than the threshold value T2 and otherwise filling said zero-valued shear-gap pixel with said background pixel value.

5. The digital image-processing apparatus defined in claim 4, wherein:

V equals 256;

T1 equals 150; and

T2 equals 30.

6. The digital image-processing apparatus defined in claim 4, wherein:

said means responsive to the distribution of pixel values comprises 5×5 sub-area histogram means.

7. The digital image-processing apparatus defined in claim 4, wherein:

said predetermined one of said L and C pixel values is said pixel value C.

8. The digital image-processing apparatus defined in claim 4 wherein:

said soft-edge processing means is effective when enabled for substituting a second interpolated value for a predetermined one of said L and C pixel values.

9. The digital image-processing apparatus defined in claim 8, wherein:

said predetermined one of said L and C pixel values is said pixel value C.

10. The digital image-processing apparatus defined in claim 8, wherein said digital image-processing apparatus further comprises:

select means including map into sheared image means for deriving said enlarged-size image as an output from said map into sheared image means by (1) mapping said first-mentioned and second interpolated values into the sheared image derived by said shear means in response to said soft-edge processing means being enabled and (2) mapping said predetermined one of said L and C pixel values or said background pixel value from said diagonally connectivity decision means into the sheared image derived by said shear means in response to said hard-edge processing means being enabled.

11. The digital image-processing apparatus defined in claim 10 wherein:

in response to said soft-edge processing means being enabled, said map into sheared image means maps all pixel values of said enlarged-size image output derived therefrom, other than said first-mentioned and second interpolated values, in a one-to-one correspondence with pixel values of said original image; and in response to said hard-edge processing means being enabled, said map into sheared image means maps all pixel values of said enlarged-size image output derived therefrom, other than all filled shear-gap pixels, in a one-to-one correspondence with pixel values of said original image.

12. In a digital image-processing method responsive to pixel values of pixels defining a digitized original two-dimensional (2D) image for increasing the number of said pixels in at least one of horizontal and vertical dimensions of said original image by a factor F=N/M, where (1) each of said pixel values falls within a range of V pixel values which extend from a quantized pixel value of 0 to a quantized pixel value of V−1, (2) N is a first given-valued integer, (3) M is a second given-valued integer and (4) 1<N/M≦2; said method comprising the steps of:

(a) upsampling said pixels defining said original image for shearing said original image at certain positions of said one dimension that are determined solely by the value of factor F, thereby introducing zero-valued shear-gap pixels at each of said certain positions; and (b) in response to solely the 6 pixel values of those pixels within a 2×3 sub-area that borders a zero-valued shear-gap pixel at a particular certain position, logically determining whether that zero-valued shear-gap occurred at a soft edge or, alternatively, at a hard edge;

(c) filling the zero-valued shear-gap at that particular certain position with an interpolated pixel value of said original image in response to said zero-valued shear-gap having been logically determined to be a soft edge; and (d) filling the zero-valued shear-gap at that particular certain position with a logically-chosen non-interpolated hard-edge object pixel value or non-interpolated background pixel value in response to said zero-valued shear-gap having been logically determined to be a hard edge;

whereby the use of said digital image-processing method is effective in substantially reducing blur in the display of hard-edge objects of a digitized enlarged-size 2D image on a flat-panel screen composed of at least one 2D array of a predetermined fixed number of individual light-controlling elements without adversely affecting the display of soft-edge objects of said digitized enlarged-size 2D image on said flat-panel screen.

* * * * *